US009895915B2

(12) United States Patent
Borrell Bayona et al.

(10) Patent No.: US 9,895,915 B2
(45) Date of Patent: Feb. 20, 2018

(54) COMPENSATING SWATH HEIGHT ERROR

(71) Applicant: HEWLETT-PACKARD DEVELOPMENT COMPANY, L.P., Houston, TX (US)

(72) Inventors: M. Isabel Borrell Bayona, Barcelona (ES); Xavier Farina Vargas, Sant Cugat del Valles (ES); Leticia Rubio, Sant Cugat del Valles (ES); Utpal Kumar Sarkar, Sant Quirze del Valles (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/673,721

(22) Filed: Aug. 10, 2017

(65) Prior Publication Data
US 2017/0348990 A1 Dec. 7, 2017

Related U.S. Application Data

(63) Continuation of application No. 15/310,171, filed as application No. PCT/US2014/038898 on May 21, 2014, now Pat. No. 9,770,926.

(51) Int. Cl.
*B41J 2/21* (2006.01)
*G06K 15/10* (2006.01)
(Continued)

(52) U.S. Cl.
CPC ......... *B41J 25/308* (2013.01); *B41J 2/04505* (2013.01); *B41J 2/04508* (2013.01);
(Continued)

(58) Field of Classification Search
CPC .... B41J 2/04505; B41J 2/04508; B41J 2/155; B41J 2/2132; B41J 2/2139; B41J 2/2146;
(Continued)

(56) References Cited

U.S. PATENT DOCUMENTS

| 5,124,720 | A | * | 6/1992 | Schantz | B41J 2/2139 347/19 |
| 6,010,205 | A | | 1/2000 | Billet | |
| 6,375,307 | B1 | * | 4/2002 | Vinals | B41J 2/5056 347/16 |
| 6,547,362 | B2 | | 4/2003 | Subirada | |
| 6,672,697 | B2 | * | 1/2004 | Haflinger | B41J 2/2135 347/12 |
| 7,118,188 | B2 | | 10/2006 | Vilanova | |
| 7,216,953 | B2 | | 5/2007 | Wada | |
| 7,300,128 | B2 | | 11/2007 | Espasa et al. | |

(Continued)

FOREIGN PATENT DOCUMENTS

WO    WO-2013026670    2/2013

OTHER PUBLICATIONS

Vantram, S.R. et al; "Fully Automated Calibration Procedure to Compensate Print Non-uniformities Incurred in Fixed Print-head Array Structures"; Jan. 2014; http://www.ricoh.com/ja/technology/techreport/39/pdf/RTR39a18.pdf.

*Primary Examiner* — Anh T. N. Vo
(74) *Attorney, Agent, or Firm* — HP Inc. Patent Department

(57) ABSTRACT

Example implementations relate to swath height error compensation. Some examples may determine a density of an image to be printed in an overlap area of a printing material. The overlap area may include target pixels capable of being printed by a first set of drop ejection elements and a second set of drop ejection elements that are redundant to the first set of drop ejection elements. Some implementations may also determine a mask to apply to the first and second set of drop ejection elements based on the determined density, and the mask may designate at least one additional drop to apply to at least one target pixel in the overlap area by at least one of the first and second set of drop ejection elements. Some implementations may also apply the mask to the first set of drop ejection elements and the second set of drop ejection elements.

15 Claims, 5 Drawing Sheets

(51) Int. Cl.
*B41J 25/308* (2006.01)
*B41J 2/155* (2006.01)
*B41J 2/045* (2006.01)
*B41J 29/393* (2006.01)

(52) U.S. Cl.
CPC ............. *B41J 2/155* (2013.01); *B41J 2/2132* (2013.01); *B41J 2/2139* (2013.01); *B41J 2/2146* (2013.01); *B41J 29/393* (2013.01); *G06K 15/102* (2013.01); *G06K 15/107* (2013.01)

(58) Field of Classification Search
CPC ..... B41J 25/308; B41J 29/393; G06K 15/102; G06K 15/107; G06K 2215/101; G06K 2215/111
See application file for complete search history.

(56) References Cited

U.S. PATENT DOCUMENTS

| | | |
|---|---|---|
| 7,417,768 B1 | 8/2008 | Donovan |
| 7,591,521 B2 | 9/2009 | Aruga |
| 7,857,412 B2 | 12/2010 | Wada |
| 8,454,110 B2 | 6/2013 | Ochiai et al. |
| 2002/0130914 A1 | 9/2002 | Mantell et al. |
| 2003/0058295 A1 | 3/2003 | Heiles et al. |
| 2003/0063153 A1 | 4/2003 | Bauer |
| 2008/0284804 A1 | 11/2008 | Seccombe |
| 2012/0139984 A1 | 6/2012 | Lang |
| 2012/0212527 A1 | 8/2012 | Setine et al. |

* cited by examiner

COMPENSATING SWATH HEIGHT ERROR

BACKGROUND

A printing device, such as a printer, multifunction printer, or the like, may be used to print content onto print media. The resulting print may have a number of inherent characteristics due to the printing process. One such characteristic may be area fill uniformity, which may indicate whether the printed area appears to be uniform in color and/or texture.

BRIEF DESCRIPTION OF THE DRAWINGS

The following detailed description references the drawings, wherein.

DETAILED DESCRIPTION

Figure 1:
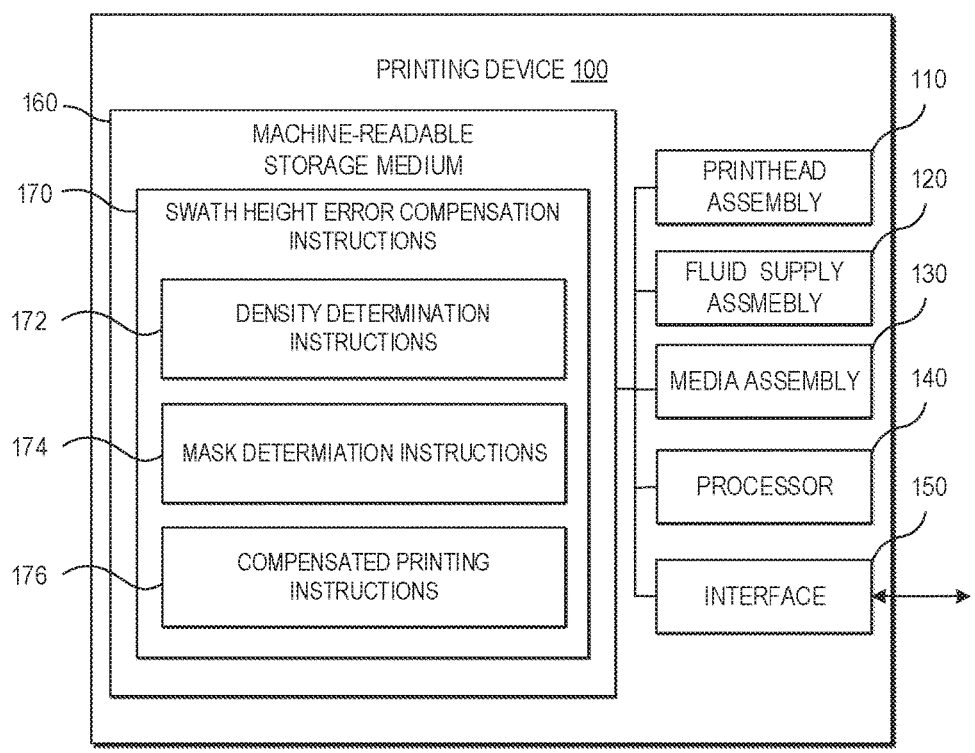
FIG. 1 is a block diagram of an example printing device consistent with disclosed implementations.

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

As detailed above, one characteristic of print quality may be area fill uniformity. With the introduction of new types of printers, such as Page Wide Array ("PWA") printers, this characteristic has been more challenging to achieve. For example, unlike some conventional printers, PWA printers may not include a moving carriage. Instead, there may be a bar of printhead dies covering the width of the print media and oriented orthogonally to the print media path. Printhead assemblies in this bar may include thousands of nozzles which eject drops of printing fluid as the print media moves under the bar in a substantially perpendicular direction. Since PWA printers may include thousands of nozzles dispersed on multiple partially overlapping PWA printhead dies, the ejection of printing fluid from those printhead dies may create an aerodynamic turbulence which may not prevent the printing fluid from reaching its intended destination. One result of this aerodynamic turbulence may be defects in the image, such as poor area fill uniformity created by Dynamic Swath Height Error ("DHSE").

DHSE involves the variation in the swath of printing fluid that printheads in a printing device, such as a PWA printer, print on print media. For example, DHSE may affect the trajectory of the drops ejected by the nozzles in the outermost edges of the PWA printhead dies. This may result in drops of printing fluid landing in the wrong position and towards the center of the die, making the swath printed by the PWA printhead die thinner than intended. While the swath dimension may depend on the amount of printing fluid used (and thus the content of the image), the greater the amount of printing fluid ejected by the nozzles, the more the swath shrinks, resulting in a gap in areas corresponding to areas between the printhead dies. This gap may show up as an image quality defect, such as white lines in the image corresponding to transitions between overlapping printhead dies. Accordingly, to help achieve optimal print quality, a printing device should compensate for image defects created by DHSE.

Examples disclosed herein may provide swath height error compensation. To this end, example implementations disclosed herein may provide swath height error compensation by determining a density of an image to be printed. In some implementations, the density may be determined for an overlap area including target pixels (e.g., pixels to be printed on a print medium) capable of being printed by a first set of drop ejection elements of a first printhead die and a second set of drop ejection elements of a second printhead die. Additionally, some implementations may determine a mask to apply to the first set of drop ejection elements and the second set of drop ejection elements. For example, the mask may designate at least one additional drop to apply to at least one target pixel in the overlap area by the first set of drop ejection elements, the second set of drop ejection elements, or a combination of the first set of drop ejection elements and the second set of drop ejection elements. In some examples, the mask may be applied to the first set of drop ejection elements and the second set of drop ejection elements. For example, a printing device may eject the at least one additional drop of printing fluid on the overlap area based on the mask.

Referring now to the drawings, FIG. 1 is a block diagram of an example printing device 100 consistent with disclosed implementations. Printing device 100 may be implemented in various ways. For example, printing device 100 may be a PWA printer, an inkjet printer, a computing system, and/or any other type of device that can produce content (e.g. images, text, etc.) on a print medium. In the example shown in FIG. 1, printing device 100 may include a printhead assembly 110, an ink supply assembly 120, a media assembly 130, a processor 140, an interface 150, and a machine-readable storage medium 160.

Printhead assembly 110 may be any device capable of ejecting drops of printing fluid toward a print media. For example, printhead assembly 110 may include at least one printhead die which ejects drops of printing fluid through orifices or nozzles onto a print medium to produce a printed image. A print medium may be any suitable material for printing, such as paper, cardstock, transparencies, textiles, mesh, and the like. Typically, the nozzles may be arranged in at least one column or array such that properly sequenced ejection of printing fluid from the nozzles may cause characters, symbols, and/or other graphics or images to be printed upon a print medium as the print medium is moved relative to printhead assembly 110. An example of printhead assembly 110 consistent with disclosed implementations is discussed in more detail bellow with respect to, for example, FIG. 2.

Printing fluid supply assembly 120 may be any device capable of supplying printing fluid to a component of printing device 100. For example, printing fluid supply assembly 120 may be a component or collection of components that supplies printing fluid, such as ink, to printhead assembly 110. In some implementations, printing fluid supply assembly 120 may include a removable, replaceable, and/or refillable reservoir for storing printing fluid. Printing fluid may flow from the reservoir to printhead assembly 110. In some implementations, printhead assembly 110 and printing fluid supply assembly 120 may be housed together to form a cartridge or pen. In some implementations, printing fluid supply assembly 120 may be separate from printhead assembly 110 and may supply printing fluid to printhead assembly 110 through an interface connection, such as a supply tube.

Media assembly 130 may be any component or collection of components that transports a print medium relative to printhead assembly 110. For example, media assembly 130 may function to advance or position a print medium relative to printhead assembly 110, such as by advancing or positioning the print medium in a direction substantially orthogonal to printhead assembly 110.

Processor 140 may be at least one processing unit (CPU), microprocessor, and/or another hardware device to execute instructions to perform operations. For example, processor 140 may fetch, decode, and execute swath height error compensation instructions 170 (e.g., instructions 172, 174, and/or 176) stored in machine-readable storage medium 160 to perform operations related to disclosed examples.

Interface device 150 may be any device that facilitates the transfer of information between printing device 100 and external components, such as another printing device, a scanner, a desktop computer, a laptop computer, a tablet computing device, a mobile phone, a server, and/or any other suitable type of device. In some examples, interface device 150 may include a network interface device that allows printing device 100 to receive and send data to and from a network. For example, interface device 150 may retrieve and process data related to an image to be printed by printing device 100 from a remote computing system.

Machine-readable storage medium 160 may be any electronic, magnetic, optical, or other physical storage device that stores executable instructions. Thus, machine-readable storage medium 160 may be, for example, Random Access Memory (RAM), Electrically-Erasable Programmable Read-Only Memory (EEPROM), a storage drive, an optical disc, and the like. In some implementations, machine-readable storage medium 160 may be a non-transitory computer-readable storage medium, where the term "non-transitory" does not encompass transitory propagating signals. Machine-readable storage medium 160 may be encoded with instructions that, when executed by processor 140, perform operations consistent with disclosed implementations. For example, machine-readable storage medium 160 may include swath height error compensation instructions 170 that, when executed by a processor, perform operations that may compensate for swath height error. In the example shown in FIG. 1, machine-readable storage medium 160 may include density determination instructions 172, mask determination instructions 174, and/or compensated printing instructions 176.

Density determination instructions 172 may function to determine an image density of an image to be printed. For example, when density determination instructions 172 are executed by a processor, such as processor 140 of print device 100, density determination instructions 172 may cause processor 140 and/or another processor to determine a density of an image to be printed in an overlap area. In some implementations, the overlap area may include target pixels capable of being printed by both a first set of drop ejection elements of a first printhead die and a second set of drop ejection elements of a second printhead die of printhead assembly 110. In some examples, density determination instructions 172 may cause processor 140 of print device 100 and/or another processor to determine the density of the image by determining a halftone level of at least one target pixel in the overlap area. In some implementations, the halftone level may correspond to the drop density (e.g., the number of printing fluid drops) per target pixel. Furthermore, in some implementations, density determination instructions 172 may also cause processor 140 of print device 100 and/or another processor to store data related to the density determination in machine-readable storage medium 160 and/or in another storage device. Examples of these analyses are described in further detail below with respect to, for example, FIG. 4.

Mask determination instructions 174 may function to determine a mask to apply to a printhead assembly. For example, when mask determination instructions 174 are executed by a processor, such as processor 140 of printing device 100, mask determination instructions 174 may cause the processor to determine a mask to apply to printhead assembly 110 based on the determined density. In some examples, the mask may be applied on a per-pixel basis, meaning that a mask may be applied to each target pixel in an overlap area that has a particular density. For example, if an overlap area included 10 target pixels, each of the 10 target pixels may be assigned its own mask (although each mask need not be different from another mask applied to a target pixel in the overlap area). As another example, if an overlap area included 10 target pixels (3 having a first density value, 5 having a second density value, and 2 having a third density value), the 3 target pixels with the first density value may be assigned to at least one mask (e.g., a first mask), the 5 target pixels with the second density value may be assigned to at least one mask (e.g., a second mask), and the 2 target pixels with the third density value may also be assigned to at least one mask (e.g., a third mask). Thus, in some examples, each pixel having a first density value may be printed using the same mask or series of masks, each pixel having a second density value may be printing using the same mask of series of masks, and the like.

In some implementations, a mask may designate printing fluid drops to apply to a target pixel in the overlap area by the first set of drop ejection elements and the second set of drop ejection elements of printhead 110. For example, the mask may designate at least one additional drop to apply to at least one target pixel by at least one of the first set of drop ejection elements and the second set of drop ejection elements. In some examples, mask determination instructions 174, when executed by processor 140 and/or another processor, may select a first mask or a second mask based on the halftone value of the target pixel. In some examples, the first mask may designate that the first set of drop ejection elements or both the first set of drop ejection elements and the second set of drop ejection elements apply drops to each of the target pixels, and the second mask may designate that the first set of drop ejection elements and the second set of drop ejection elements both apply drops to each of the target pixels. Examples of these analyses are described in further detail below with respect to, for example, FIGS. 4 and 5.

Compensated printing instructions 176 may function to apply the determined mask to a printhead assembly. For example, when compensated printing instructions 176 are executed by a processor, such as processor 140 of printing device 100, compensated printing instructions 176 may cause processor 140 and/or another processor to apply the mask to the first set of drop ejection elements and the second set of drop ejection elements of printhead 110. In some implementations, compensated printing instructions 176, when executed by processor 140, may eject drops of printing fluid on the overlap area of a print medium based on the applied mask to print the image. Examples of these analyses are described in further detail below with respect to, for example, FIG. 4.

The arrangement illustrated in FIG. 1 is simply an example, and printing device 100 may be implemented in a number of different configurations. For example, while FIG. 1 shows one printhead assembly 110, printing fluid supply assembly 120, media assembly 130, processor 140, interface 150, and machine-readable storage medium 160, printing device 100 may include any number of components 110, 120, 130, 140, 150, and 160 as well as other components not depicted in FIG. 1. For example, printing device 100 may omit any of components 110, 120, 130, 140, 150, and 160 and/or combine at least one of components 110, 120, 130, 140, 150, and 160 (e.g., printhead assembly 110 and printing fluid supply assembly 120 may be housed together). As another example, while FIG. 1 shows that each of components 110, 120, 130, 140, 150, and 160 are communicatively connected, at least one of components, 110, 120 130, 140, 150, and 160 may not be communicatively connected to other components of printing device 100 or to external components. As yet another example, while FIG. 1 shows that each of components 110, 120, 130, 140, 150, and 160 are internal to printing device 100, at least one of components 110, 120, 130, 140, 150, and 160 may be external to printing device 100. For example, machine-readable storage medium 160 including processing instructions 170 may be located in a computing system external to printing device 100.

Figure 2:
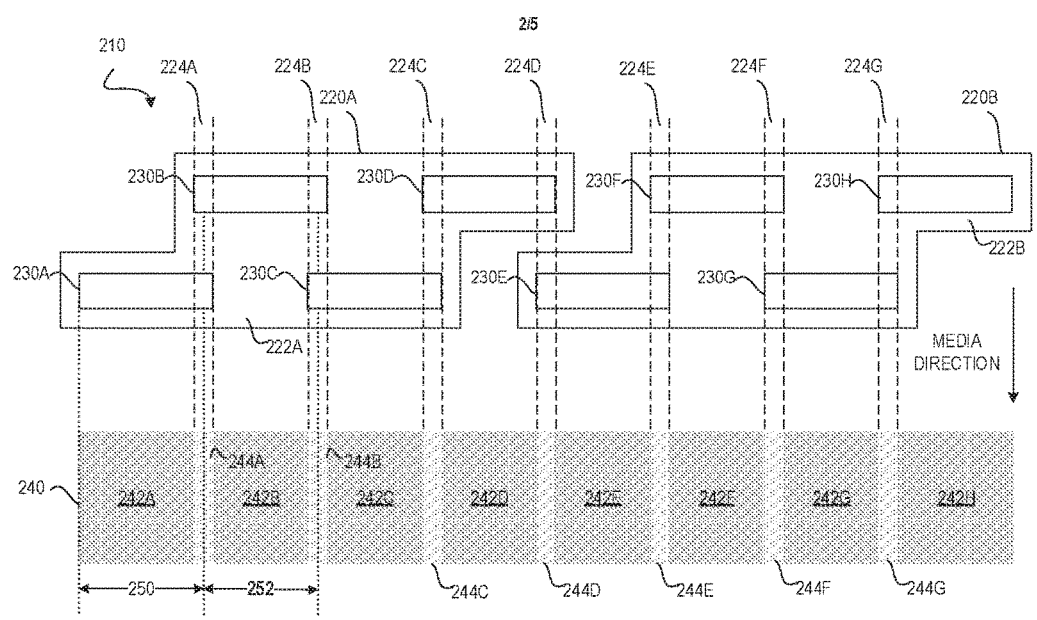
FIG. 2 is a top view of an example of a printhead assembly printing an image consistent with disclosed implementations.

FIG. 2 is a top view of an example of a printhead assembly 210 printing an image 240 consistent with disclosed implementations. In certain aspects, printhead assembly 210 may correspond to printhead assembly 110 of FIG. 1. For example, printhead assembly 210 may perform functions similar to those describe above with respect to printhead assembly 110 of FIG. 1 and/or may be incorporated with printing device 100 of FIG. 1. Although printhead assembly 210 may be described below with reference to printing device 100 of FIG. 1 and/or specific components of printing device 100, other suitable systems and devices may be used with printhead assembly 210.

As shown in FIG. 2, printhead assembly 210 may be a wide-array or multi-head printhead assembly including a plurality of modules 220. At least one of modules 220 may include at least one printhead die 230. For example, each module 220 may include a plurality of printhead dies 230 and may function to carry the dies 230 and provide electrical and fluidic communication between printhead dies 230, a printing fluid supply assembly (such as printing fluid supply assembly 120 discussed above with respect to FIG. 1), and/or an electronic controller (such as processor 140 and machine-readable storage medium 160 discussed above with respect to FIG. 1).

Dies 230 may be mounted on a face 222 of module 220 and aligned in at least one row. In some implementations, printhead dies 230 may include at least one array of printing or drop ejecting elements, such as nozzles. In some implementations, at least one drop ejecting element of a particular printhead die may be redundant to another drop ejecting elements of another printhead die. That is, in some examples, a nozzle of a particular die may share a printing axis (i.e., an axis extending in a direction substantially parallel to the advancing direction of the print media during printing) with another nozzle of another printhead die such that target pixels corresponding to the printing axis are capable of being printed by either printhead die. For example, printhead die 230A may include a first set of drop ejection elements that are redundant to a second set of drop ejection elements of printhead die 230B such that the first set and the second set of drop ejection elements are capable of ejecting drops on the same area of a print medium (e.g., on overlap area 224A).

In some implementations, printhead dies 230 may be arranged in at least one overlapping row. For example, printhead dies 230 may be arranged in a first row and a second row that is spaced from and oriented substantially parallel to the first row. Additionally, printhead dies 230 in the first row may be offset from printhead dies in 230 in the second row such that each printhead die 230 in the first row of a module 220 overlaps at least one printhead die 230 in the second row with respect to a direction substantially perpendicular to the printing axis. As a result, the print swath of each printhead die 230 may overlap with at least one adjacent printhead die in the same module 220 or in different modules 220A and 220B.

Portions of print media corresponding to an overlap of two printhead dies 230 may be considered to be overlap areas 224A through 224G. Printing device 100 may instruct particular nozzles in printhead dies 230 to print in the overlap areas 224. For example, printing device 100 may apply at least one halftone mask such that printhead die 230A may print half of the target pixels in overlap area 224A and printhead die 230B may print half of the target pixels in overlap area 224A. Thus, printhead die 230A may print the portion of image 240 covered by print swath 250, and printhead die 230B may print the portion of image 240 covered by print swath 252. As shown in FIG. 2, if printing device 100 does not execute die error compensation instructions 170, the resulting image 240 may include a number of image defect areas 244A through 224G corresponding to die overlap areas 224A through 224G. For example, the aerodynamic turbulence created by the movement of the print media and the ejection of the large number of printing fluid drops by printhead assembly 210 may cause printing fluid drops released by dies 230A and 230B to land at the wrong location, thus creating gaps or lighter lines between swaths 250 and 252. The visibility of these image defects in image defect areas 244 may be reduced when printing device 100 executes swath height error compensation instructions 170. For example, when processor 140 of print device 100 executes swath height error compensation instructions 170, a mask may be applied that designates at least one additional drop to apply to at least one target pixel. The mask may compensate for the aerodynamic turbulence by assuming that the printing fluid drops will not end up exactly at their intended location. Accordingly, in some examples the mask may add additional drops to the halftone image mask at strategic locations based on the image density to compensate for the movement of the drops during printing. Accordingly, when processor 140 of print device 100 executes swath height error compensation instructions 170, the gaps or lighter lines between swaths 250 and 252 may be substantially indiscernible to a user viewing the printed image.

It is to be understood that FIG. 2 is a simplified schematic illustration of printhead assembly 210, and that printhead assemblies consistent with disclosed implementations may include any number of modules, dies, and the like. Furthermore, modules and dies consistent with the disclosed examples may be of any suitable size, shape, and arrangement.

Figure 3:
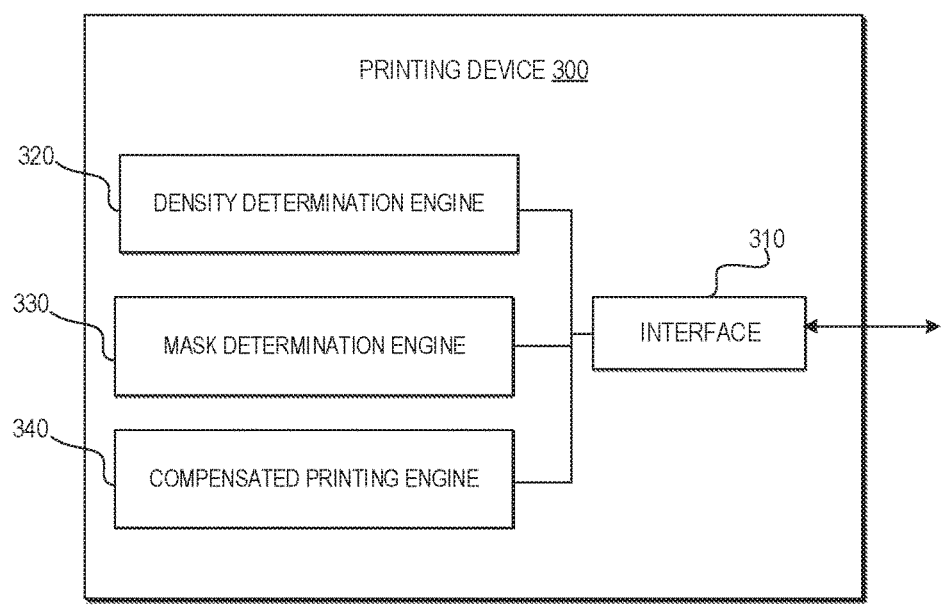
FIG. 3 is a block diagram of an example printing device consistent with disclosed implementations.

FIG. 3 is a block diagram of an example printing device 300 consistent with disclosed implementations. In certain aspects, printing device 300 may correspond to printing device 100 of FIG. 1. Printing device 300 may be implemented in various ways. For example, printing device 300 may be a printer, a special purpose computer, a server, a mainframe computer, a computing device executing instructions that receive and process information and provide responses, and/or any other type of computing system. In the example shown in FIG. 3, printing device 300 may include an interface device 310, a density determination engine 320, a mask determination engine 330, and a compensated printing engine 340.

Interface device 310 may be any device that facilitates the transfer of information between printing device 300 and external components. In some examples, interface device 310 may include a network interface device that allows printing device 300 to receive and send data to and from a network. For example, interface device 310 may retrieve and process data related to printing an image from a printer external to printing device 300.

Engines 320, 330, and 340 may be electronic circuitry for implementing functionality consistent with disclosed examples. For example, engines 320, 330, and 340 may represent combinations of hardware devices and programming to implement functionality consistent with disclosed implementations. For example, the programming for the engines may be processor executable instructions stored on a non-transitory machine-readable storage medium and the hardware for the engines may include a processing resource to execute those instructions. In some examples, the functionality of engines 320, 330, and 340 may correspond to operations performed by printing device 100 of FIG. 1, such as operations performed when die error compensation instructions 170 are executed by processor 140. In FIG. 3, density determination engine 320 may represent a combination of hardware and programming that performs operations similar to those performed when processor 140 executes density determination instructions 172. Similarly, mask determination engine 330 may represent a combination of hardware and programming that performs operations similar to those performed when processor 140 executes mask determination instructions 174, and compensated printing engine 340 may represent a combination of hardware and programming that performs operations similar to those performed when processor 140 executes compensated printing instructions 176.

Figure 4:
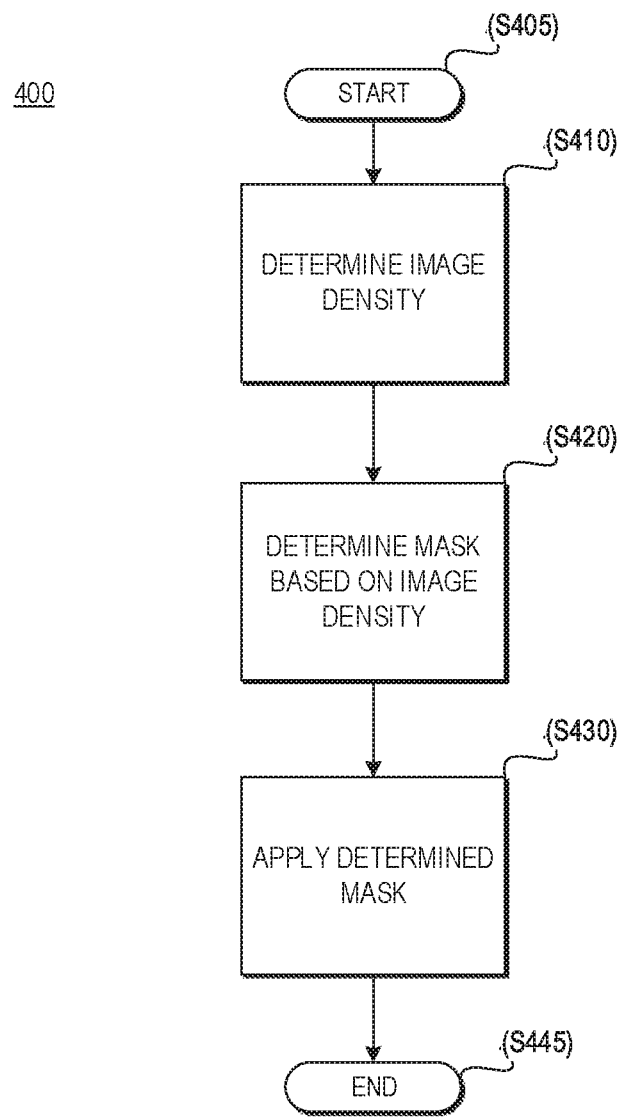
FIG. 4 is a flow chart of an example process for swath height error compensation consistent with disclosed implementations.

FIG. 4 is a flow chart of an example process 400 for swath height error compensation consistent with disclosed implementations. Although execution of process 400 is described below with reference to printing device 100 of FIG. 1 and/or specific components of printing device 100, other suitable systems and devices for execution of at least one step of process 400 may be used. For example, processes described below as being performed by printing device 100 may be performed by printing device 300 and/or any other suitable device. Process 400 may be implemented in the form of executable instructions stored on a storage device, such as a machine-readable storage medium, and/or in the form of electronic circuitry.

Process 400 may start (step S405) before an image is printed on a print medium. For example, process 400 may start when printing device 100 receives or otherwise accesses instructions to print an image on a print medium. Once printing device receives or otherwise accesses the instructions, printing device 100 may determine a density of an image (step S410) to be printed. In some implementations, the density of the image may be determined for at least the portion of the image to be printed in an overlap area of a printing material. The overlap area may correspond to an overlap between a first set of drop ejection elements of a first printhead die and a second set of drop ejection elements of a second printhead die, and may include target pixels capable of being printed by the first set of drop ejection elements and the second set of drop ejection elements.

In some implementations, printing device 100 may determine a density of an image before the image is printed. For example, printing device 100 may determine the density by using data from an image transformation process, such as a halftoning process. The halftoning process may transform a continuous-tone grayscale or color image into a halftone image with a limited number of tone levels (e.g., CMYK) such that the halftone image may be printed by a printing device, such as printing device 100. The halftone image may include halftone pixels with various values which may correspond to the number of printing fluid drops to be deposited per target pixel. For example, a halftone value of 0 may correspond to 0 drops per target pixel, a halftone value of 1 may correspond to 1 drop per target pixel, a halftone value of 2 may correspond to 2 drops per target pixel, a halftone value of 3 may correspond to 3 drops per target pixel, and the like. Thus, in some implementations, the density of the image may correspond to the drop density per target pixel.

In some implementations, printing device 100 may determine a density of the image by identifying halftone image pixels that correspond to target pixels in the overlap area (hereinafter the "identified halftone image pixels") and/or determining halftone values of the identified halftone image pixels. The halftone values may include any number of values based on the image and, in some instances, the particular printing device being used to print the image. For example, in some implementations, there may be three halftone values (a first value, a second value, and a third value), while in other implementations there may be two values, five values, and the like.

In some implementations, printing device 100 may determine halftone values of the identified halftone image pixels by analyzing the image using various image processing techniques. For example, when the determination of the halftone values of the identified halftone image pixels goes beyond simple pointwise pixel values, printing device 100 may analyze pixels adjacent to a particular identified halftone image pixel to determine its halftone value.

In some implementations, printing device 100 may determine halftone values of the identified halftone image pixels by accessing data stored in a machine-readable storage medium, such as machine-readable storage medium 160 and/or another storage device. For example, a storage medium, such as machine-readable storage medium 160, may include at least one interconnected database which may store information related to the image, such as a bitmap of the image, the halftone image, the halftone values of the image, information related to the identified halftone image pixels, and the like. The at least one database may be configured using any appropriate type of storage system configuration that facilitates the storage of data, as well as the locating, accessing, and retrieving of data stored in the databases (e.g., Oracle, SQL, Access, etc. databases). The databases may include a query function that, in response to determining the identified halftone image pixels, may query image-related information stored in the databases to identify image information meeting specified criteria. For example, printing device 100 may perform a query based on the identified halftone image pixels to determine the halftone values of the identified halftone image pixels.

Step 410 of process 400 may also include storing data associated with the density determination. For example, printing device 100 may provide data regarding the density determination to an image storage device, such as a machine-readable storage medium (e.g., machine-readable storage medium 160), and/or another device for additional processing. Examples of stored data may include the halftone image, information related to the identified halftone image pixels, the halftone value(s) of the corresponding halftone image pixels, the date/time of the density determination, and/or any other data related to determination of the density of the image.

Process 400 may also include determining a mask to apply to the printhead assembly (step S420) based on the determined density. For example, process 400 may include determining a mask to apply to a first set of drop ejection elements of a first printhead die and a second set of drop ejection elements of a second printhead die based on the determined density. In some implementations, the second set of drop ejection elements may be redundant to the first set of drop ejection elements.

In some examples, the mask may designate drops to apply to at least one target pixel in the overlap area by both the first set of drop ejection elements and the second set of drop ejection elements. In some implementations, the mask may designate at least one additional drop to apply to at least one target pixel by at least one of the first set of drop ejection elements and the second set of drop ejection elements. For example, the mask may designate drops to apply to the overlap area as dictated by the halftone image as well as additional drops to apply to the overlap area to compensate for swath height error. Thus, in some implementations, the mask may adjust the number of drops to apply to a target pixel in an overlap area based on a density of an image to be printed in the overlap area. For example, the number of drops may be initially defined by the halftone image. Thus, in some examples, the mask may adjust the number of drops defined by the halftone image to apply additional drops to a particular target pixel in the overlap area, and not apply additional drops to another target pixel in the overlap area. In some examples, the mask may adjust the number of drops defined by the halftone image to apply fewer drops to a particular target pixel.

The determination of the mask to apply to the printhead assembly based on the determined density may be performed in a number of ways. For example, in some implementations, step S420 of process 400 may include determining the mask by accessing the halftone values of the identified halftone image pixels, accessing a plurality of masks, and selecting a mask from the plurality of masks for target pixels with a particular halftone value.

Printing device 100 may access halftone values of the identified halftone image pixels in a number of ways. In some examples, printing device 100 may use image processing techniques to determine the halftone value of the identified halftone image pixels. In some examples, printing device 100 may access data stored in a machine-readable storage medium, such as machine-readable storage medium 160 and/or another storage device to access stored halftone values, such as the stored halftone values discussed above. For example, as discussed above, machine-readable storage medium 160 may include at least one database that includes a query function that, in response to determining the identified halftone image pixels, may query image-related information stored in the at least one database to determine the halftone values of the identified halftone image pixels. In some examples, printing device 100 may also provide data regarding the halftone values to a storage device, such as a machine-readable storage medium (e.g., machine-readable storage medium 160), and/or another device for additional processing.

Printing device 100 may access a plurality of masks stored in a machine-readable storage medium, such as machine-readable storage medium 160 and/or another storage device to select a mask. In some implementations, the plurality of masks may include a first mask, a second mask and a third mask. For example, the first mask may correspond to target pixels having a first halftone value and may designate that pixels having the first halftone value be printed according to the halftone image. In some implementations, the first mask may designate that target pixels with a first halftone value receive a number of drops corresponding to the first halftone value, and/or that the first halftone values represent a low drop density per target pixel. For example, the first halftone value may correspond to a drop density of 0 and/or 1. An example of a first mask is discussed in greater detail below with respect to, for example, FIG. 5.

In some examples, a second mask corresponding to target pixels having a second halftone value may designate: at least one additional drop to apply to a first plurality of the target pixels in the overlap area having the second halftone value by both the first set of drop ejection elements and the second set of drop ejection elements; and at least one drop to apply to a second plurality of the target pixels having the second halftone value by one of the first set of drop ejection elements and the second set of drop ejection elements. In some examples, the second mask may designate that the some of the target pixels in the overlap area having a first halftone value receive a number of drops corresponding to the second halftone value and other target pixels in the overlap area having a second halftone value receive a number of drops corresponding to the second halftone value and at least one additional drop. In some examples, the second mask may designate that the first set of drop ejection elements or both the first set of drop ejection elements and the second set of drop ejection elements apply the at least one additional drop to each of the target pixels having the second halftone value. An example of a second mask is discussed in greater detail below with respect to, for example, FIG. 5.

In some examples, a third mask corresponding to target pixels having a third halftone value may designate at least one additional drop to apply to a first plurality of the target pixels having the third halftone value and a second plurality of target pixels having the third halftone value by both the first set of drop ejection elements and the second set of drop ejection elements. In some examples, the third mask may designate that each target pixel with the third halftone value receive a number of drops corresponding to the third halftone value and at least one additional drop. In some examples, the third mask may designate that the first set of drop ejection elements and the second set of drop ejection elements both apply the at least one additional drop to each of the target pixels having the third halftone value. An example of a first mask is discussed in greater detail below with respect to, for example, FIG. 5.

In some implementations, printing device 100 may select a mask from the plurality of masks by performing a query of the at least one database based on a particular halftone value, such as a halftone value accessed as described above. For example, at least one mask may be stored with information that links the mask with at least one halftone value, and printing device 100 may perform a query to determine the appropriate mask based on the linked halftone value (e.g., query for a mask corresponding to a halftone value of "1"). In some examples, the mask may be stored with information that links the masks with at least one halftone value and/or at least one of a plurality of different types of printing devices. Accordingly, in some implementations printing device 100 may perform a query based on the halftone value and the device type of the printing device which will print the image (e.g., query for a mask corresponding to a halftone value of "1" and a device type of "A"). The mask identified by the query may be stored in a machine-readable storage medium, such as machine-readable storage medium 160, and/or another device for additional processing as a selected mask.

Process 400 may also include applying the selected mask (step S430) to the first set of drop ejection elements and the second set of drop ejection elements. In some examples, the mask may be applied to portions of printhead assemblies that correspond with overlap areas without being applied to other portions of printhead assemblies that do not correspond to overlap areas. For example, the mask may be applied to a first set of drop ejection elements of a first printhead die and a second set of drop ejection elements of a second printhead die, but not applied to other drop ejection elements of the first printhead die and the second printhead die. In some implementations, the selected mask may be a single mask or a plurality of separate masks applied to at least one overlapping printhead die 230 (e.g., a mask to apply to a first set of drop ejection elements of a first printhead die and/or a second set of drop ejection elements of a second printhead die). In some implementations, the selected mask may be a weaving mask For example, each overlap area may have two sequences of masks: a first sequence which applies printing fluid to print the image in the overlap area using the first printhead die and/or the second printhead die; and a second sequence which applies additional drops based on the halftone value of a target pixel using the first printhead die and/or the second printhead die to correct any swath height error. As another example of two sequences of masks, the first sequence may apply printing fluid to print the image in the overlap area using the first printhead die and/or the second printhead die for target pixels having a first halftone value; and the second sequence may apply printing fluid to print the image in the overlap area using the first printhead die and/or the second printhead die for target pixels having a second halftone value. In some implementations, the selected mask may be applied by assigning the mask to particular drop ejection elements. Additionally, in some implementations, the mask may be applied by ejecting drops of printing fluid on the overlap area based on the selected mask. For example, printhead assembly 110 may eject drops of printing fluid through orifices or nozzles onto a print medium to produce a printed image.

After the image density is determined (step S410), the mask is determined based on the image density (step S420), and the determined mask is applied (step S430), process 400 may end (step S445).

Figure 5:
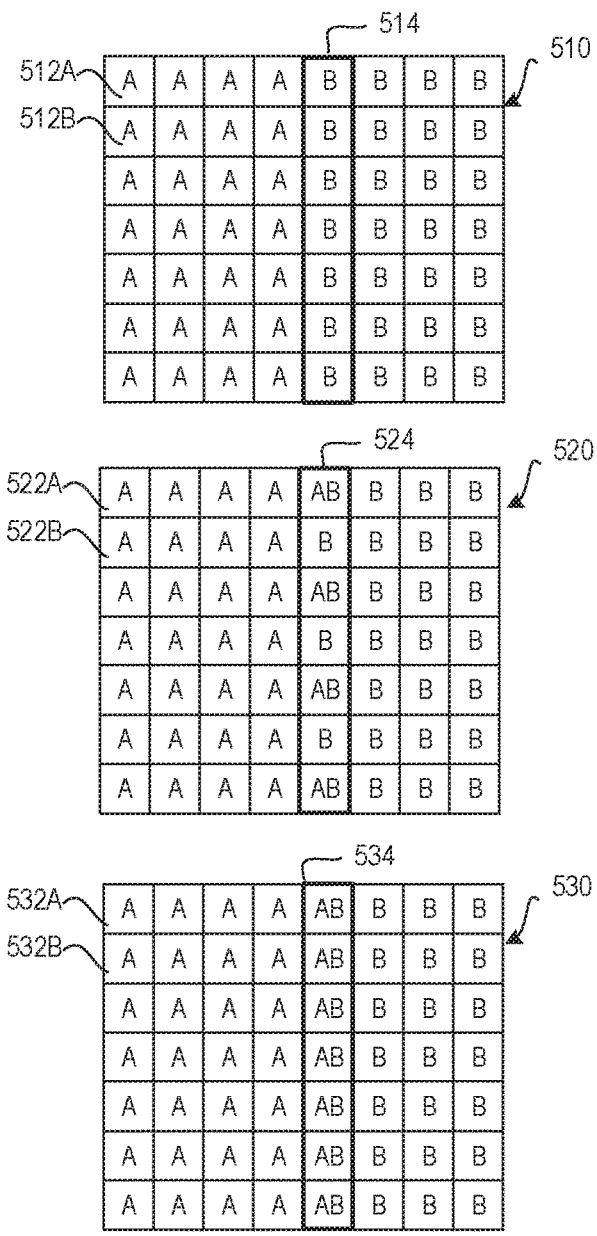
FIG. 5 illustrates three example print masks for compensating swath height error consistent with disclosed implementations.

FIG. 5 illustrates three example print masks 510, 520, and 530 for compensating swath height error consistent with disclosed implementations. In certain aspects, masks 510, 520, and 530 may relate to print masks described in steps S420 and S430 of FIG. 4 and applied to various components described in FIGS. 1-3. In some implementations, masks 510, 520, and 530 may represent the position where a firing instruction is given to a drop ejection element from a first printhead die (die "A") and/or a second printhead die (die "B"). In some implementations, masks 510, 520, and 530 may be weaving masks, binary masks, binary filters, and/or the like which instruct individual drop ejection elements of a printhead assembly, such as printhead assembly 110, printhead assembly 210, and/or the like, to address a pixel that occurs in an image file in a defined sequence of firing. In the example shown in FIG. 5, mask 510 may correspond to a mask for target pixels that have a first halftone value (e.g., a halftone value of 1 (where one drop of printing fluid is applied per target pixel)), mask 520 may correspond to a mask for target pixels that have a second halftone value (e.g., a halftone value of 2 (where two drops of printing fluid are applied per target pixel)), and mask 530 may correspond to a mask for target pixels that have a third halftone value (e.g., a halftone value of 3 (where three drops of printing fluid are applied per target pixel)).

Mask 510 may correspond to a mask used to deposit drops on target pixels having a first halftone value. For example, mask 510 may be used when a halftone image pixel corresponding to a target pixel has a halftone value of 1, or a low halftone value. In some implementations, mask 510 may include a number of rows and columns which define a plurality of cells 512 (for simplicity, only two of which have been labelled in FIG. 5), and each cell 512 may correspond to a target pixel in an overlap area. As shown in FIG. 5, each cell may indicate whether the target pixel with the first halftone value will include printing fluid fired by a first set of drop ejection elements in a first printhead die (die A) or a second set of drop ejection elements in a second printhead die (die B). The character "A" in a cell may indicate that at least one nozzle of printhead die A is fired for the target pixel, and the character "B" in a cell may indicate that at least one nozzle of printhead die B is fired for the target pixel. As shown in FIG. 5, the target pixels to be fired by nozzle A may meet the target pixels to be fired by nozzle B in a connection area 514 (indicated by a bolded rectangle in FIG. 5). A connection area may include target pixels to be printed by the first set of drop ejection elements that are adjacent to target pixels to be printed by the second set of drop ejection elements. Furthermore, in some implementations, target pixels with low halftone values (and thus less printing fluid to deposit) may not encounter significant DSHE in an overlap area. Accordingly, mask 510 may not compensate for swath height error and may simply print the target pixel as dictated by other image processing instructions.

Mask 520 may correspond to a mask used to deposit drops on target pixels having a second halftone value. For example, mask 520 may be used when a halftone image pixel corresponding to a target pixel has a halftone value of 2, or a medium halftone value. In some implementations, mask 520 may designate that a first set of drop ejection elements or both a first set of drop ejection elements and a second set of drop ejection elements apply drops to each of the target pixels having a second halftone value. In some implementations, mask 520 may include a number of rows and columns which define a plurality of cells 522 (for simplicity, only two of which have been labelled in FIG. 5), and each cell 522 may correspond to a target pixel in an overlap area. As shown in FIG. 5, each cell may indicate whether the target pixel will include printing fluid fired by a first set of drop ejection elements in a first printhead die (die A), a second set of drop ejection elements in a second printhead die (die B), or both the first set of drop ejection elements and the second set of drop ejection elements (dies A and B). The character "A" in a cell may indicate that at least one nozzle of printhead die A is fired for the target pixel, the character "B" in a cell may indicate that at least one nozzle of printhead die B is fired for the target pixel, and the character "AB" in a cell may indicate that at least one nozzle of printhead die A and at least one nozzle of printhead die B is fired for the target pixel.

As shown in FIG. 5, the target pixels to be fired by nozzle A may meet the target pixels to be fired by nozzle B in a connection area 524 (indicated by a bolded rectangle in FIG. 5). For example, connection area 524 may include target pixels that are printed by die A and die B, and may alternate between target pixels to be printed by a single overlapping die and target pixels to be printed by multiple (in this example, two) overlapping dies. While in this particular example, the target pixels in the connection area printed by a single die are printed by printhead die B, some implementations can print the single-die target pixels using die A.

Mask 530 may correspond to a mask used to deposit drops on target pixels having a third halftone value. For example, mask 530 may be used when the target pixel has a halftone value of 3, or a high halftone value. In some implementations, mask 530 may designate that a first set of drop ejection elements and a second set of drop ejection elements both apply drops to each of the target pixels with the third halftone value. In some implementations, mask 530 may include a number of rows and columns which define a plurality of cells 532 (for simplicity, only two of which have been labelled in FIG. 5), and each cell 532 may correspond to a target pixel in an overlap area. As shown in FIG. 5, each cell may indicate whether the target pixel will include ink fired by a first set of drop ejection elements in a first printhead die (die A), a second set of drop ejection elements in a second printhead die (die B), or both the first set of drop ejection elements and the second set of drop ejection elements (dies A and B). The character "A" in a cell may indicate that at least one nozzle of printhead die A is fired for the target pixel, the character "B" in a cell may indicate that at least one nozzle of printhead die B is fired for the target pixel, and the character "AB" in a cell may indicate that at least one nozzle of printhead die A and at least one nozzle of printhead die B is fired for the target pixel. As shown in FIG. 5, the target pixels to be fired by nozzle A may meet the target pixels to be fired by nozzle B in a connection area 534 (indicated by a bolded rectangle in FIG. 5). For example, connection area 534 may include target pixels that are printed by both printhead die A and printhead die B.

While FIG. 5 shows three masks 510, 520, and 530, any number of masks corresponding to any number of halftone values may be used. Furthermore, while FIG. 5 shows 8×8 masks with 64 cells and 7 cells in a connection area, masks 510, 520, and/or 530 can include any number of cells and have any number of connection areas. Additionally, while FIG. 5 shows rectangular connection areas 514, 524, and 534, connection areas 514, 524, and 534 consistent with disclosed implementations may be any shape and size and thus need not be rectangular. Furthermore, the distribution of pixels between the dies in masks 510, 520, and/or 530 are not limited to the distribution shown in FIG. 5. For example, while the depiction of mask 510 in FIG. 5 shows approximately half of the target pixels will be deposited by die A and half will be deposited by die B, the distribution of target pixels between the dies is not limited to these values. For example, the distribution of target pixels may be much more interwoven than the example shown in FIG. 5 and may extend over the entire width of the overlap area such that both dies A and B may be used to varying extents. As another example, while masks 510, 520, and 530 may be considered to be directed to level-dependent weaving at the end of the printhead die, masks consistent with disclosed implementations may compensate for swath height error throughout an overlap area and may distribute work differently over involved printhead dies depending on the content of the image to be printed. For example, masks consistent with disclosed implementations may distribute the work load randomly for low-variation content such as photographs and regularly for high variation content such as technical drawings or text.

The disclosed examples may include systems, devices, computer-readable storage media, and methods for compensating swath height error. For purposes of explanation, certain examples are described with reference to the components illustrated in FIGS. 1-5. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may be used herein to describe various elements, these elements should not be limited by this terms. Instead, these terms are used to distinguish one element from another.

Further, the sequence of operations described in connection with FIGS. 1-5 are examples and are not intended to be limiting. Additional or fewer operations or combinations of operations may be used or may vary without departing from the scope of the disclosed examples. For example, printing device 100 may omit the step of determining the density of the image to be printed. As another example, printing device need not start process 400 after receiving or otherwise accessing instructions to print an image on a print medium. Thus, the present disclosure merely sets forth possible examples of implementations, and many variations and modifications may be made to the described examples. All such modifications and variations are intended to be included within the scope of this disclosure and protected by the following claims.

We claim:
1. A computer-implemented method for correcting swath height error, comprising:
   determining a swath height error for an overlap area of an image to be printed by at least two printhead die by determining an amount of printing fluid to be deposited in the overlap area, wherein the swath height error:
      indicates a degree of movement of the printing fluid during printing; and
      is dependent upon the amount of printing fluid deposited in the overlap area;
   determining a mask, based on the amount of printing fluid to be deposited in the overlap area, to apply to the at least two printhead die, which mask compensates for the swath height error; and
   controlling operation of the at least two printhead die based on the mask.

2. The computer-implemented method of claim 1, wherein a greater amount of printing fluid to be deposited in the overlap area indicates a greater swath height error.

3. The computer-implemented method of claim 1, wherein:
the mask indicates additional drops to apply to target pixels in the overlap area to compensate for the swath height error; and
the mask is applied on a per-pixel basis.

4. The computer-implemented method of claim 3, wherein pixels having the same density map to the same mask.

5. The computer-implemented method of claim 1, wherein determining a mask to apply to the at least two printhead die comprises:
determining a first mask to apply to a first printhead die; and
determining a second mask to apply to a second printhead die.

6. The computer-implemented method of claim 1, wherein determining a mask to apply to the at least two printhead die comprises selecting the mask from a plurality of masks for target pixels with a particular density.

7. The computer-implemented method of claim 1, wherein controlling operation of the at least two printhead die based on the mask comprises:
executing a first mask sequence to apply printing fluid to print the image in the overlap area; and
executing a second mask sequence to apply additional drops to correct for swath height error.

8. The computer-implemented method of claim 1, wherein determining a mask is further based on content of the image to be printed.

9. A swath height error correction device, comprising:
a density determination engine, comprising a processor, to determine an amount of printing fluid to be deposited in an overlap area of an image to be printed, which amount of printing fluid indicates a swath height error for the overlap area, wherein the overlap area comprises target pixels capable of being printed by a first printhead die and a second printhead die that overlap one another;
a mask determination engine, comprising a processor, to determine a mask, based on the amount of printing fluid to be deposited in the overlap area, to apply to the first printhead die and the second printhead die; and
a compensated printing engine, comprising a processor, to eject additional drops of printing fluid on the overlap area based on a determined mask.

10. The swath height error correction device of claim 9, wherein:
the density determination engine determines an amount of printing fluid to be deposited in an overlap area of an image to be printed by determining a halftone level of the target pixels;
different target pixels have different halftone levels; and
the mask determination engine determines a mask for the different target pixels based on determined halftone levels for the target pixels.

11. The swath height error correction device of claim 10, wherein the density determination engine determines the halftone levels by accessing data stored in a database which stores information related to the image to be printed.

12. The swath height error correction device of claim 11, wherein the database further maps the halftone levels to a type of printing device that is to print the image.

13. The swath height error correction device of claim 10, wherein the density determination engine determines the halftone levels for target pixels by analyzing adjacent pixels.

14. A computing system, comprising:
a processor;
a machine-readable storage medium coupled to the processor; and
a swath height error compensation instruction set stored in the machine-readable storage medium to be executed by the processor, wherein the swath height error compensation instruction set comprises:
instructions to determine a swath height error for an overlap area of an image to be printed by at least two printhead die by determining an amount of printing fluid to be deposited in the overlap area, wherein the swath height error:
indicates a degree of movement of the printing fluid during printing; and
is dependent upon the amount of printing fluid deposited in the overlap area;
instructions to determining a mask, based on the amount of printing fluid to be deposited in the overlap area, to apply to the at least two printhead die, which mask indicates additional drops to apply to target pixels in the overlap area to compensate for the swath height error; and
instructions to eject the additional drops of printing fluid on the overlap area based on the mask.

15. The computing system of claim 14, wherein the instructions to determining a mask, to apply to the at least two printhead die indicate which of a first printhead die and a second printhead die are to eject the additional drops.

* * * * *

UNITED STATES PATENT AND TRADEMARK OFFICE
CERTIFICATE OF CORRECTION

PATENT NO. : 9,895,915 B2
APPLICATION NO. : 15/673721
DATED : February 20, 2018
INVENTOR(S) : M. Isabel Borrell Bayona et al.

It is certified that error appears in the above-identified patent and that said Letters Patent is hereby corrected as shown below:

In the Drawings

In FIG. 1, Reference Numeral 174, delete "DETERMIATION" and insert -- DETERMINATION --, therefor.

Signed and Sealed this
Seventh Day of August, 2018

Andrei Iancu
*Director of the United States Patent and Trademark Office*